April 1, 1941.  C. A. JOHNSON  2,237,229
POISON POWDER DISTRIBUTOR
Filed March 28, 1939   2 Sheets-Sheet 1
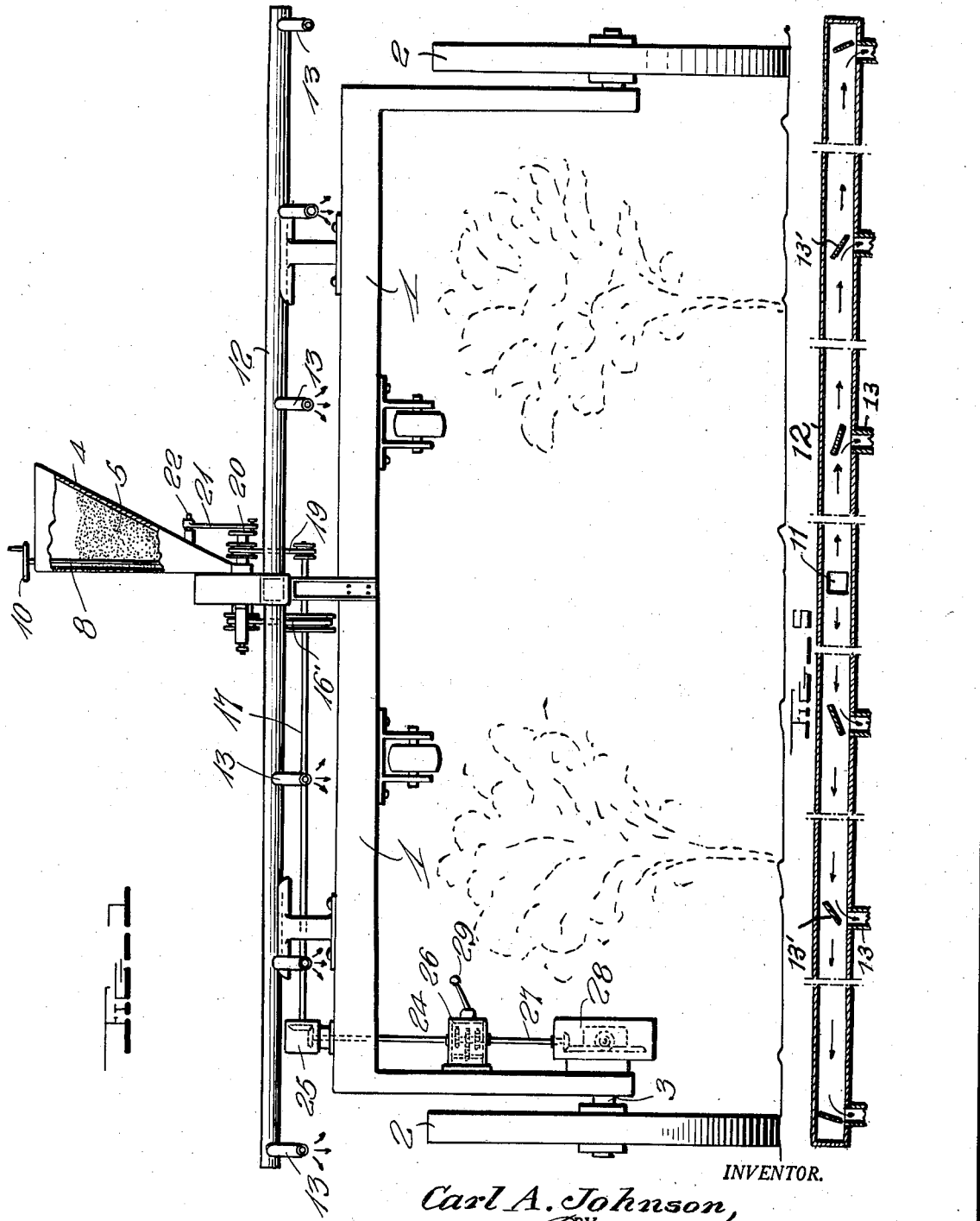
INVENTOR.
Carl A. Johnson,
BY
ATTORNEY

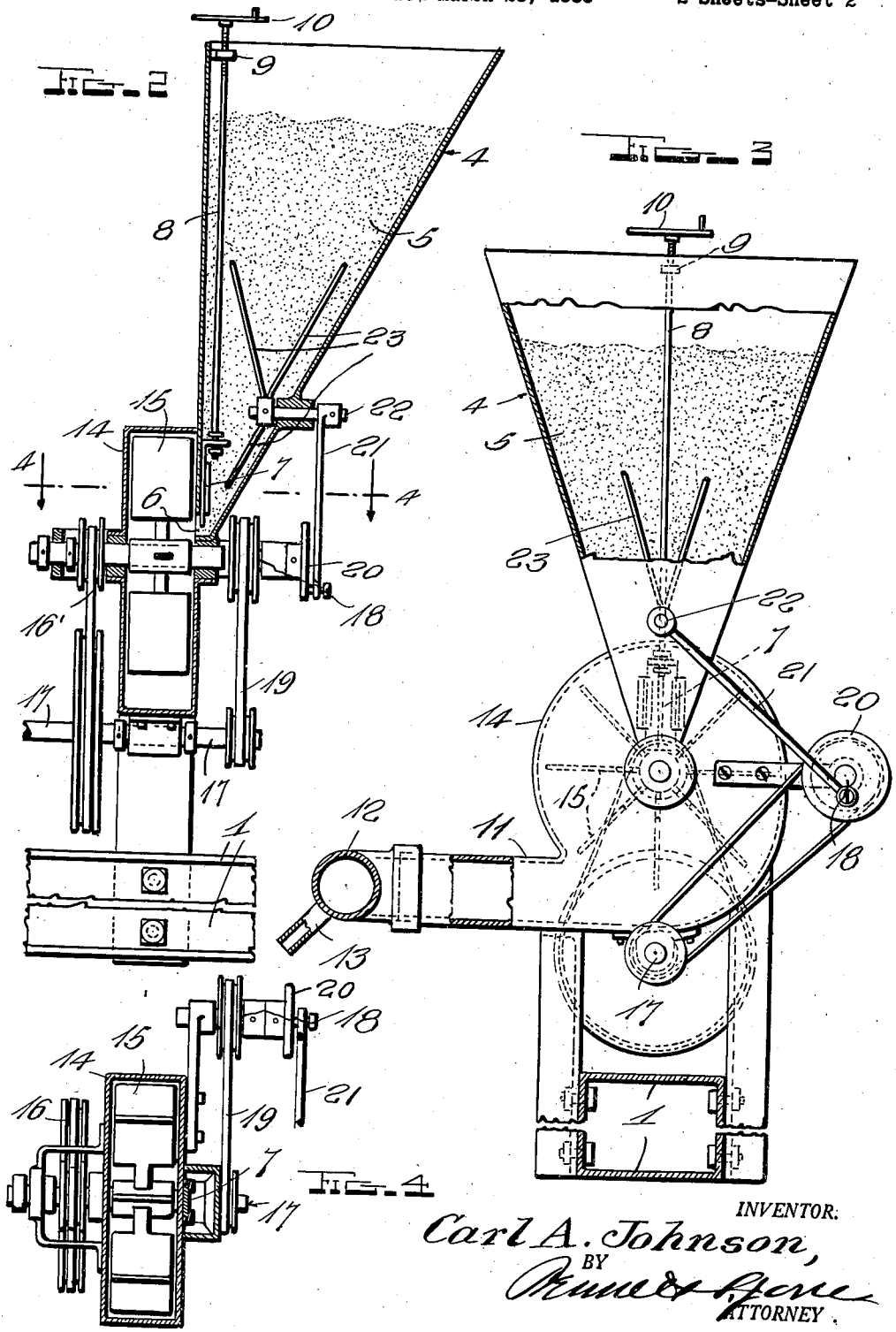

Patented Apr. 1, 1941

2,237,229

UNITED STATES PATENT OFFICE 2,237,229

POISON POWDER DISTRIBUTOR

Carl A. Johnson, Thrall, Tex.

Application March 28, 1939, Serial No. 264,648

1 Claim. (Cl. 43—148)

This invention relates to an apparatus whereby poison powder or a dry insecticide of suitable character may be distributed and applied to cotton, tobacco or other plants growing in the field and at a time of cultivation, or at other times, in such manner that the insectide, preferably in powdered form, may be uniformly and efficiently distributed.

The object of the invention is to provide a simple, reliable and inexpensive construction of distributor of this character whereby the distribution may be properly regulated, and which may be applied to and operated from a horse-drawn or motor-propelled vehicle.

The invention consists of the features of construction, combination and arrangement of parts, hereinafter fully described and claimed, reference being had to the accompanying drawings, in which:

Fig. 1 is a view in rear elevation of the frame of a horse-drawn vehicle showing the application of the distributor thereto.

Fig. 2 is a vertical transverse section through the distributor.

Fig. 3 is a sectional side elevation of the distributor.

Fig. 4 is a horizontal section on line 4—4 of Fig. 3.

Fig. 5 is a longitudinal section through the distributing pipe.

Referring now more particularly to the drawings, 1 represents a frame of a cultivator or other agricultural implement or vehicle of either horse-drawn or motor-propelled type. In the present instance the frame 1 is shown as mounted on wheels 2 carried by axles 3. Suitably supported upon this frame or any other part of the vehicle is a hopper 4 containing the powdered insecticide 5 to be distributed. This hopper is provided at its bottom with an outlet 6 for the discharge of the insecticide powder, said outlet being normally closed by a valve 7. This valve 7 is connected to the lower end of a controlling shaft or rod 8, having a threaded engagement, as at 9, with the hopper whereby it may be adjusted vertically and it is provided at its upper end with a hand wheel or other adjusting device 10. By means of this rod or shaft the valve 7 may be adjusted to regulate the discharge of the insecticide through the outlet 6.

The outlet 6 communicates with a feed conduit 11 leading to a distributing tube or pipe 12 extending transversely of the vehicle and provided at intervals with discharge nozzles 13. Included in this conduit 11 is a blower casing 14 in which operates a blower fan or wheel 15 operating when in action to draw the material 5 from the hopper 4 by suction and to force the same with a blast of air through the conduit 11 into the distributor pipe 12 for discharge through the nozzle 13.

The fan or blower 15 is mounted on a shaft 16 driven by belting or other driving means 16' from a shaft 17 arranged therebelow. Arranged in axial alinement with the shaft 16 is a shaft 18 also driven by belting or other suitable drive connection 19 from the shaft 17. The shaft 18 carries a crank wheel disk 20 coupled by a connecting rod 21 to an oscillatory shaft 22 journaled on and extending into the hopper. This shaft 22 carries within the hopper a vibratory agitator 23 consisting of a plurality of diverging arms to act upon the material 5 in the hopper 4. When the shaft 16 is rotated at a certain speed to drive the fan 15 the shaft 18 will be simultaneously rotated at a suitably regulated speed to oscillate the shaft 22 by means of which the agitator 23 will be oscillated or vibrated back and forth to agitate the material 5 and to keep it properly loosened up for free discharge through the outlet 6. By this means the discharge of the material in a loose or powdered condition is always ensured, clogging of the outlet 6 prevented, and efficient distribution of the material by the distributor ensured without liability of clogging the discharge nozzles.

The outlet 6 is formed at the base of the front wall of the hopper, which is straight and vertical. The hopper includes a rear wall which inclines downwardly and forwardly and side walls which incline downwardly and inwardly, said bottom and side walls converging toward the hopper bottom. A hopper of triangular form is thus provided which is of minimum dimensions at its bottom and whose bottom portion forms a contracted throat communicating with the outlet 6. The inclined or sloping back and side walls of this hopper facilitate the flow of the material to the outlet, but the agitator 23 is of special construction for cooperation with this form of hopper to prevent compacting of the material therein and to ensure free feed of the material to the outlet 6. This agitator comprises the horizontal shaft 22 which is journaled in the inclined back wall of the hopper and the agitator arms or blades 23 mounted on the inner end of this shaft. Of these, there is a single arm projecting downwardly from the shaft into the contracted throat parallel with the back wall and a plurality of arms extending upwardly from the shaft into the hopper. As shown in the present instance, there are two upwardly extending arms which are respectively inclined upwardly and forwardly and upwardly and rearwardly or in divergent relation toward the front and back walls. With this arrangement, the lower arm oscillates back and forth in the contracted throat and the upper arms oscillate back and forth in the wider portion of the hopper thereabove and on opposite sides of the center line of the hopper and between the same and the front and rear walls thereof, thus causing an initial and final agitation or freeing of the material respectively above and below the level of the shaft 22 so that compacting of the material in the hopper will be prevented and its free feed to the outlet 6 ensured.

The shaft 17 is the driven shaft of a train including a transmission shaft 24, in gear therewith, as shown at 25. The shaft 24 is arranged to be driven by variable speed transmission gearing 26 from a drive shaft 27 driven from one of the axles 3 by suitable gearing 28. The transmission gearing 26 may be similar to that used in an automobile propelling mechanism and provided with a gear shift lever 29 whereby the gearing may be set or adjusted for any one of a plurality of speeds, low, high and intermediate, for example, by which the blower and agitator in turn may be driven at different speeds to regulate the discharge of the material, thus allowing the discharge to be controlled according to the speed of the vehicle itself as well as according to conditions in the field demanding supply of different amounts of material to the plants of growing vegetation under treatment within a given area or range of motion of the distributor at any predetermined traveling speed.

The distributing pipe 12 may be of any suitable length as compared with the width of the machine and provided with any suitable number of nozzles 13, spaced any desired distance apart. Preferably this pipe connects centrally of its length with the air conduit 11 and is provided with interior baffles or fins 13' of such size or arrangement or disposed at such angles as to properly check and control the current flow to ensure the proper apportionment of the insecticide to the nozzles and the equal distribution of the insecticide through each and every nozzle.

From the foregoing description, taken in connection with the drawings, the construction and mode of operation of my improved powdered insect distributor will be readily understood by those versed in the art without a further or extended description, and it will be seen that a type of apparatus of this character is provided which may be readily applied for use to agricultural implements or vehicles of different types for distributing the insecticide to plants of growing vegetation in a field, and it will also be seen that the apparatus provides a means whereby a positive and efficient feed of the material is ensured and whereby the rate or amount of material to be distributed per area of ground may be regulated in a positive and certain manner, or the distribution regulated according to the speed of travel of the vehicle. While the construction shown is preferred it will, of course, be understood that changes in the form, proportion and arrangement of parts, as well as the details of construction, may be varied within the scope of the appended claim without departing from the spirit or sacrificing any of the advantages of the invention.

What I claim is:

An insecticide distributor for distributing a dry insecticide comprising a distributor pipe having an insecticide inlet at a point intermediate its ends and a series of discharge nozzles arranged at spaced intervals apart on each side of said inlet, an insecticide hopper having an outlet, a blower for producing a blast forcing the insecticide material issuing from said outlet into the distributing pipe through the inlet thereof, and stationary baffles in the pipe adjacent to the nozzles and inclined variably for regulating the blast and distribution of the insecticide to the nozzles according to their distances from the inlet in order to secure an equal distribution of the insecticide to all the nozzles.

CARL A. JOHNSON.